United States Patent [19]

Toropov et al.

[11] 4,409,698
[45] Oct. 18, 1983

[54] TAP FOR PRESSING ELASTIC THREAD PROFILES

[76] Inventors: Gennady A. Toropov, ulitsa Mironova, 17, kv. 45; Stepan P. Shamenko, prospekt Geroev, 33, korpus 1, kv. 45; Valery G. Badyaev, ulitsa Yuria Savchenko, 1, "A", kv. 76, all of Dnepropetrovsk, U.S.S.R.

[21] Appl. No.: 285,113

[22] PCT Filed: Jun. 26, 1980

[86] PCT No.: PCT/SU80/00105
§ 371 Date: Jul. 22, 1981
§ 102(e) Date: Jul. 22, 1981

[87] PCT Pub. No.: WO81/01672
PCT Pub. Date: Jun. 25, 1981

[30] Foreign Application Priority Data
Dec. 10, 1979 [SU] U.S.S.R. .............................. 2844301

[51] Int. Cl.³ .............................................. B23G 7/02
[52] U.S. Cl. .................................................. 10/152 T
[58] Field of Search ................. 10/140, 141 R, 141 H, 10/152 T, 153 R; 408/215, 216, 217, 218, 219, 220, 221, 222, 226, 227, 228, 229

[56] References Cited

U.S. PATENT DOCUMENTS

| 188,405 | 3/1877 | Peterson et al. | 408/218 |
| 279,360 | 6/1883 | Douglas | 408/218 X |
| 1,041,675 | 10/1912 | Robinson | 408/216 X |
| 2,204,866 | 6/1940 | Parish | 408/217 |
| 2,301,679 | 11/1942 | Bouget | 10/140 X |
| 2,369,273 | 2/1945 | Bakewell | 10/140 X |

FOREIGN PATENT DOCUMENTS

| 105309 | 9/1938 | United Kingdom | 10/140 |
| 584951 | 12/1977 | U.S.S.R. | |
| 468684 | 4/1978 | U.S.S.R. | |
| 625824 | 9/1978 | U.S.S.R. | 10/141 R |

*Primary Examiner*—Ervin M. Combs
*Attorney, Agent, or Firm*—Fleit, Jacobson, Cohn & Price

[57] ABSTRACT

The tap comprises a groove forming portion (1) with a shank (2) having a thread forming portion (3) such that the thread pitch thereof is equal to that of the groove forming portion (1), the crests of the thread forming portion (3) being axially displaced from those of the groove forming portion (1). The thread forming portion (3) is threadedly positioned behind the groove forming portion (1) for axial movement on the shank (2), the movement thereof being limited by a stop (4) arranged on the shank.

2 Claims, 3 Drawing Figures

U.S. Patent   Oct. 18, 1983   4,409,698
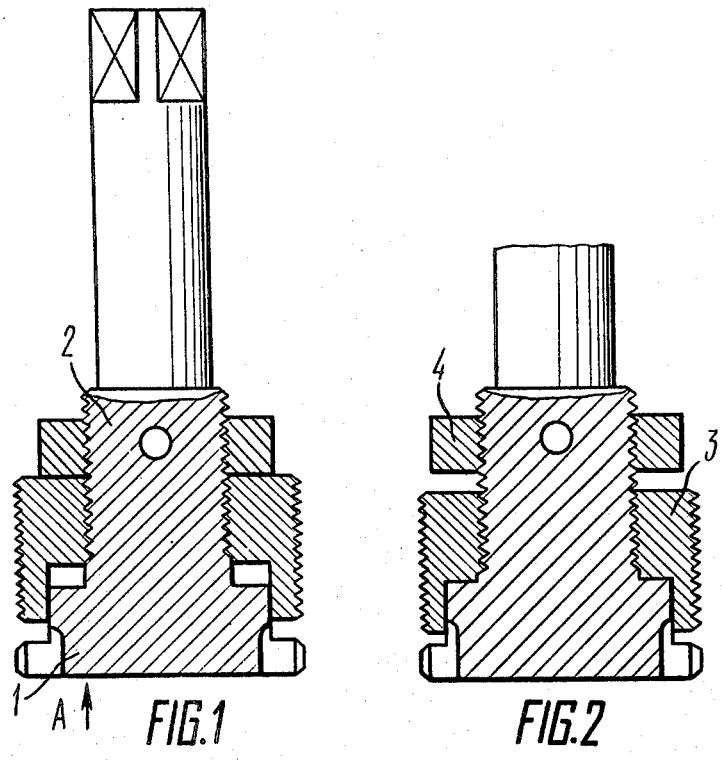
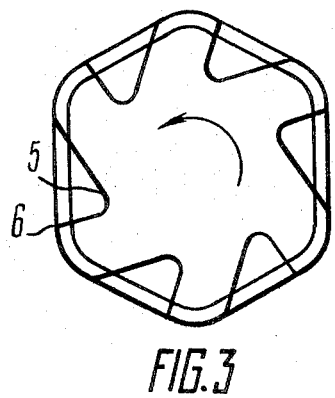

TAP FOR PRESSING ELASTIC THREAD PROFILES

TECHNICAL FIELD

The invention relates to the art of manufacturing products having elements of helical shape by plastic deformation of the metal of a work piece and may be utilized for pressing internal threads of an elastic profile in through and preferably blind holes.

BACKGROUND ART

Known in the art are taps for pressing elastic thread profiles capable of tapping through holes only.

After the thread has been cut the tapped part is screwed off the tap and released over the shank of the tap.

Such a tap for pressing elastic thread profiles comprises a groove forming portion and a thread forming portion arranged on the tap axis in series and having points and threads of equal pitch. These portions are interconnected by a neck portion having a length which is less than that of the thread to be tapped. Also, the crests of the thread forming portion are axially displaced from those of the groove forming portion.

The amount of displacement is that of half the pitch of the thread to be tapped.

Motion of the groove forming portion through the hole of a part produces a helical groove either by cutting or pressing. At the moment the thread forming portion comes into operation the groove forming portion acts as a threading block providing a lead to the thread crests of the thread forming portion between the valleys of the helical groove that has been formed.

The thread forming portion impresses a thread by reshaping the helical groove into a confined space, which is arranged in the core of the thread profile that has been formed. The space reduces the sectional area of the thread profile formed, which makes it possible to increase elastic deformation of the profile along the axis of the thread.

This ensures a more favorable load distribution between threads of a threaded connection and improves its strength (SU, Inventor's Certificate No. 625,824 published Apr. 19, 1977, Int. Cl. B 21 H 3/08, of Dniepropetrovsky ordena Trudovogo Krasnogo Znameni gorny institut im. Artema).

This tap is unsuitable for pressing elastic thread profiles in blind holes because the groove forming portion, as the tap is being backed out of the hole, will distort the thread that has been formed by reason of the axial displacement of its crests from those of the thread portion.

DISCLOSURE OF THE INVENTON

The invention has for its object to provide a tap for pressing elastic thread profiles in blind holes, wherein the groove forming portion and the thread forming portion are so connected that in backing the tap out of the threaded hole the crests of the thread of the groove forming portion are disposed in the roots of the thread profile formed and do not distort the thread.

The object set forth is attained by the provision of a tap for pressing elastic thread profiles, comprising on the shank of a groove forming portion a thread forming portion such that the thread pitch thereof is equal to that of the groove forming portion, the crests of the thread forming portion being axially displaced from those of the groove forming portion, wherein according to the invention the thread forming portion is positioned behind the groove forming portion for axial movement on the shank, the movement thereof being limited by a stop arranged on the shank.

According to a preferred embodiment of the invention the groove forming portion has flutes such that the cutting edges thereof are adjacent the heels of the sides of the flutes on the back of the groove forming portion.

The tap of the invention provides for pressing elastic thread profiles in blind holes due to the fact that as the tap is backed out of the threaded hole the groove forming portion does not distort the thread.

Because the groove forming portion moves on the internal thread of the thread forming portion in a similar way as along a threading block, as the tap is backed out the result is, that the crests of the thread of the groove forming portion are disposed in the roots of the thread formed, which makes it possible to simultaneously screw out the two portions.

By cutting away the remaining helical groove by means of the cutting edges of the flutes of the groove forming portion, as the tap is backed out, the common force required to back the tap out of the hole is decreased.

BRIEF DESCRIPTION OF THE DRAWINGS

The invention will now be described in detail with reference to the accompanying drawings, in which:

FIG. 1 is a general view of the tap in the course of pressing the thread;

FIG. 2 is a view of the tap as it is backed out of the threaded hole;

FIG. 3 is a bottom view of the groove forming portion.

An arrow in FIG. 3 shows the direction of thread.

BEST MODE FOR CARRYING OUT THE INVENTION

A tap for pressing elastic thread profiles in blind holes comprises a groove forming portion 1 having a shank 2. Adjacent the groove forming portion on the shank 2 there is a thread for engaging a thread forming portion 3, which is followed by a stop 4 rigidly mounted as by pin or welding on the shank 2 so as to provide a predetermined axial displacement of the tap portions in pressing an elastic thread profile as the stop comes in contact with the thread forming portion 3.

On the faces of the groove forming portion 1 there are cut out flutes 5 such that the cutting edges 6 thereof are adjacent the heels of the sides of the flutes on the back of the groove forming portion.

The tap operates as follows.

The groove forming portion 1 forms a helical groove along the length of the surface in which the profile of the thread is to be impressed as it moves in the hole by a self-pulling action.

As the thread forming portion 3 moves axially along shank 2 by the screw action along the shank thread, it comes in contact with the stop 4 whereby the crests of the thread forming portion 3 are received between the valleys of the helical groove formed in the hole in the part. As a result of the passage of the thread forming portion 3 the metal is displaced and the helical groove is reshaped into the thread profile that has been formed.

As the tap is being backed out of the hole the frictional forces between the profile of the thread produced and the thread forming portion 3 hold the latter in the hole without any rotation.

As the tap is backed out, the cutting edges 6 of the flutes 5 in the groove forming portion 1 cut away some turns of the remaining helical groove up to the point at which the threads formed by thread forming portion 3 commence.

In doing this, the groove forming portion 1 moves outwardly of the hole and along the internal thread of the thread forming portion 3 until it comes into contact with the thread forming portion, whereupon both groove forming portion 1 and thread forming portion 3 are simultaneously unscrewed from the hole in the part. As the tap is backed out the crests of the groove forming portion are received in the roots of the thread produced.

INDUSTRIAL APPLICABILITY

Such a tap may be used in any branch of mechanical engineering such as aircraft manufacture, in the automotive and tractor industry, in the machine-tool industry and so on, for producing internal threads of improved strength in through and blind holes in parts of ductile steels and alloys.

We claim:

1. A tap for pressing elastic thread profiles, comprising
   a shank including a groove forming portion for forming a helical groove;
   a thread forming portion threadedly carried on said shank and having a thread pitch thereof equal to that of the groove forming portion, the crests of the thread forming portion axially displaced from those of the groove forming portion; and
   a stop member positioned on said shank;
   said thread forming portion movable axially along said shank between said stop member and said groove forming portion.
2. A tap as claimed in claim 1 wherein said groove forming portion has flutes including cutting edges and heel portions, said cutting edges positioned adjacent said heel portions of the flutes and operative only when the tap is backed out of a threaded hole.

* * * * *